United States Patent
Goldstein et al.

(10) Patent No.: US 11,068,762 B2
(45) Date of Patent: *Jul. 20, 2021

(54) DUAL CODE AUTHENTICATION PROCESS

(71) Applicant: VerifyMe, Inc., Rochester, NY (US)

(72) Inventors: Keith Goldstein, Rochester, NY (US); Patrick White, Rochester, NY (US)

(73) Assignee: VerifyMe, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,814

(22) Filed: Feb. 14, 2020

(65) Prior Publication Data

US 2020/0184294 A1 Jun. 11, 2020

Related U.S. Application Data

(63) Continuation of application No. 16/178,736, filed on Nov. 2, 2018, now Pat. No. 10,614,350.

(60) Provisional application No. 62/582,660, filed on Nov. 7, 2017.

(51) Int. Cl.
| | |
|---|---|
| *G06K 19/06* | (2006.01) |
| *G06F 16/532* | (2019.01) |
| *G07D 7/128* | (2016.01) |
| *G07D 7/0043* | (2016.01) |

(52) U.S. Cl.
CPC ..... *G06K 19/06056* (2013.01); *G06F 16/532* (2019.01); *G06K 19/0614* (2013.01); *G07D 7/0043* (2017.05); *G07D 7/128* (2013.01)

(58) Field of Classification Search
CPC ......... G06K 19/06056; G06K 19/0614; G07D 7/0043; G07D 7/128; G06F 16/532
USPC ...................................................... 235/494
See application file for complete search history.

(56) References Cited

U.S. PATENT DOCUMENTS

| | | | |
|---|---|---|---|
| 6,483,576 B1 | 11/2002 | Gardner | |
| 6,672,718 B1 | 1/2004 | Stovold | |
| 6,813,011 B2 | 11/2004 | Gardner et al. | |
| 7,798,403 B2* | 9/2010 | Tiller | G06K 19/08 |
| | | | 235/451 |
| 7,939,239 B2 | 5/2011 | Gardner et al. | |
| 8,551,683 B2 | 10/2013 | Gardner et al. | |
| 8,841,063 B2 | 9/2014 | Gardner et al. | |
| 8,998,093 B2* | 4/2015 | Atkinson | G06Q 20/202 |
| | | | 235/487 |
| 9,159,016 B2 | 10/2015 | Gardner et al. | |
| 9,183,688 B2 | 11/2015 | Gardner et al. | |
| 10,614,350 B2* | 4/2020 | Goldstein | G06F 16/532 |
| 2012/0254052 A1* | 10/2012 | Gao | G06Q 30/018 |
| | | | 705/318 |
| 2013/0320099 A1 | 12/2013 | Acton et al. | |

(Continued)

*Primary Examiner* — Daniel A Hess

(74) *Attorney, Agent, or Firm* — McHale & Slavin, P.A.

(57) ABSTRACT

A dual code authentication process combining a visible QR code with an invisible randomly generated code which can be alpha, numeric, symbol or image that can only be read with a reading device. A data generation engine is used to create the generated code which is assigned to the QR code and stored in a cloud based database. The QR code is decodable by a handheld reading device which communicates with the cloud based database releasing a copy of the generated code to the reading device. A reader is then used to decode the invisible printed code wherein the user can compare the printed code on the document and the code stored on the cloud based database to determine a match and authenticity.

15 Claims, 1 Drawing Sheet

(56) References Cited

U.S. PATENT DOCUMENTS

| | | | |
|---|---|---|---|
| 2013/0335783 A1* | 12/2013 | Kurtz | B42D 25/387 |
| | | | 358/3.28 |
| 2015/0048156 A1* | 2/2015 | Cleary | B42D 25/29 |
| | | | 235/375 |
| 2015/0269581 A1 | 9/2015 | Wright, Jr. | |
| 2015/0341370 A1 | 11/2015 | Khan | |
| 2016/0146725 A1 | 5/2016 | Bornstein | |
| 2017/0200035 A1* | 7/2017 | Teraura | G06K 19/06037 |
| 2019/0065798 A1* | 2/2019 | Garey | G07D 7/0043 |
| 2020/0175239 A1* | 6/2020 | Herrera | G06K 19/10 |

* cited by examiner

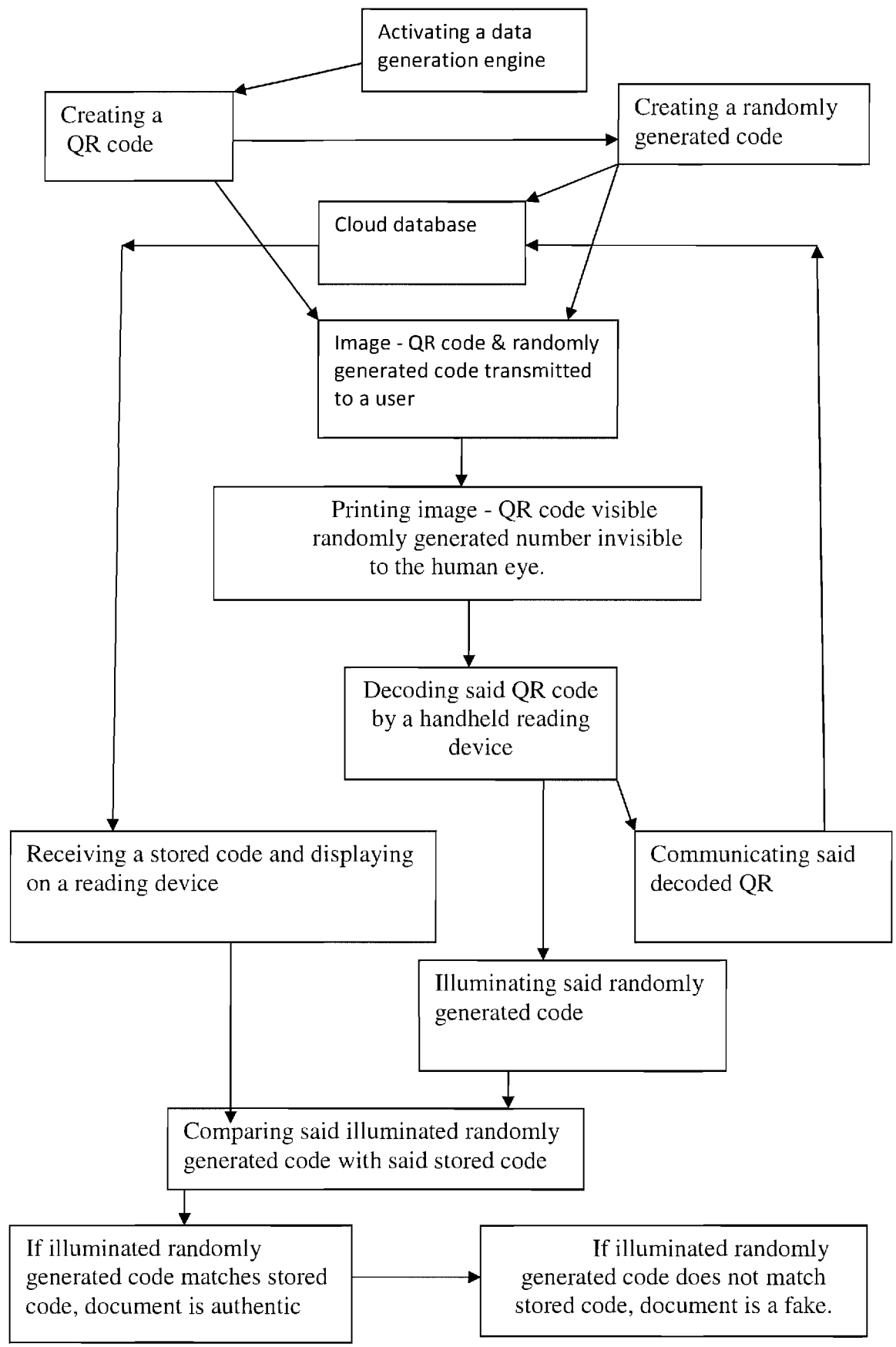

DUAL CODE AUTHENTICATION PROCESS

PRIORITY CLAIM

In accordance with 37 C.F.R. § 1.76, a claim of priority is included in an Application Data Sheet filed concurrently herewith. Accordingly, the present invention is a continuation application and claims priority to U.S. patent application Ser. No. 16/178,736 filed Nov. 2, 2018, entitled "DUAL CODE AUTHENTICATION PROCESS" which claims a priority date based on U.S. Provisional Patent Application No. 62/582,660, entitled "DUAL CODE AUTHENTICATION PROCESS", filed Nov. 7, 2017. The contents of which the above referenced application is incorporated herein by reference.

FIELD OF THE INVENTION

The invention relates generally to the field of document authenticity and, in particular, to the selective use of light sources having light emission and absorption characteristics in certain corresponding spectral bands that can be placed on a label and verified by a reader device.

BACKGROUND OF THE INVENTION

Authenticity of documents can be performed by many techniques. What is lacking in the art is the protection of labels using matching and mismatching illumination sources for absorption in certain bands, spectrally matched (or mismatched) pigments to assume a distinctly different appearance based upon the illumination source used. Prior art patents by the Applicant related to secure printing matters include U.S. Pat. Nos. 6,483,576; 6,672,718; 6,813,011; 7,939,239; 8,841,063; 9,183,688 and 9,159,016, all of which are incorporated herein by reference.

SUMMARY OF THE INVENTION

Disclosed is a process combining dual codes; a visible code assigned to an invisible code for use in document authenticity. In an exemplary example, a label is printed with a visible QR code and an invisible printed randomly generated code which can be alpha, numeric, symbol or image that can only be read with a reading device. A data generation engine is used to create the randomly generated code, which is assigned to the QR code and stored in a cloud based database. The QR code is visibly secured to a document, and the randomly generated code is invisibly secured to the document. The QR code is decodable by a handheld reading device which communicates with the cloud based database, releasing the generated code to the reading device. A reader decodes the invisible printed code, wherein a user can compare the printed code read by the reading device and the code stored on the cloud based database to determine authenticity of the label.

An objective of the invention is tandem printing of a visible QR code (or other symbol bar code) and an invisible randomly generated code (number, bar code, or image) assigned to the QR Code on a label or the like document for subsequent verification.

Another objective of the invention is to disclose a process wherein a user scans a visible QR code with a special application, or "app", on a smart phone or tablet, and a message to the authenticating device goes back to the smartphone/tablet computer that performed the scan and tells them what the hidden code, image, or number stored in the cloud at the time of printing is.

Still another objective of the invention is to provide a process wherein a user can scan a QR code which will send geolocation to a secure cloud database; wherein inspectors will have a special app which will allow them to see a secure code to confirm it is correct, which will also be logged with the database.

Yet another objective of the invention is to employ a QR code that directs a user to a website to obtain a number hidden on a document associated with the QR code using a password.

Another objective of the invention is to employ a process for producing a visual distinction in the appearance of a code or the like image when the code is illuminated by different broadband or broadband-simulative light sources.

Still another objective of the invention is to provide a device that creates a light source having an emission spectrum for illuminating invisible code, wherein the spectrum contains concentrated light energy in a narrow band in the visible spectrum. The pigmentation of invisible code is selected such that the material used to implant the code is strongly absorptive at that limited wavelength band. In this way, the code has a distinctly different color appearance under the respective illumination spectra of the two sources.

Yet still another objective of the invention is to provide two light sources used for comparison, wherein one light source has a broad and continuous spectrum, and the other light source is used to test for the presence of the pigment used to write the code; the pigment? having a strong and exclusive narrow peak emission band, preferably functioning as a primary color component of a summed wavelength set for simulating daylight or white light, and which corresponds very closely to the peak in the absorption spectrum of the pigmented code.

Another objective of the invention is to mask a normally visible code in a background of a similar hue, wherein the invention is used to cause the background or foreground to change hue so as to develop a contrast revealing the particular code. In these and other similar situations, the existence or content of the code is concealed until a particular illumination source is applied.

Still another objective of the invention is to disclose a reading device (light source) that allows a user to check the authentication of a document by reading a hidden number to determine if the hidden number matches a message sent to the authenticating device.

A benefit of the invention is that, if the reading device reveals that the hidden image on a document matches a message sent to the authenticating device then the document is authentic. If the hidden number is different or hidden, the document is a fake.

Other objectives and further advantages and benefits associated with this invention will be apparent to those skilled in the art from the description, examples and claims which follow.

BRIEF DESCRIPTION OF THE FIGURES

FIG. 1 is a flow diagram of the inventive process.

DETAILED DESCRIPTION OF THE PREFERRED EMBODIMENT

A detailed embodiment of the instant invention is disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Disclosed in Assignee's U.S. Pat. No. 8,551,683, incorporated herein by reference, is a combination light source and subject. The light source has an illumination spectrum characterized by a distinctively stronger narrow band emission peak that has a predetermined wavelength within a spectrum compared to other wavelengths; and, the subject has a pigment applied thereto, wherein the pigment has a reflection spectrum characterized by one of a distinctively stronger reflection peak at the predetermined wavelength compared to said other wavelengths, and a distinctively weaker reflection gap at the predetermined wavelength compared to said other wavelengths. The pigment gives the subject a distinct appearance when illuminated by the light source due to a color shift from the emission peak matching one of the reflection peak and the reflection gap, as compared to a nominal appearance when illuminated by an alternate light source which does not include the distinctively stronger emission peak at the predetermined wavelength as compared to said other wavelengths.

Assignee has adapted this technology in a process for marking and detecting labels with spectral band authentication features. The process includes the step of a user scanning and reading a VISIBLE QR code, (typically done by using an APP on a smart phone) which goes up to the cloud and obtains a randomly generated alpha, numeric, symbol, image or combination thereof. This code is then sent back to the user that scanned the QR code by way of a text message, email, or even a phone call, so the user can see if it matches the INVISIBLE code on the label. If the presented code matches the INVISIBLE code, the label is deemed genuine. If the code is different, or no code at all comes back, the label is a fake, counterfeit, etc.

The steps consist of: Activating a data generation engine that creates a QR code (or other symbol bar code) and a randomly generated code (number, bar code, or image) that is assigned to the QR Code. Inserting the QR code and randomly generated code into a secure cloud based database for future reference. The only known relationship between the QR code and the randomly generated code is in the secure database. Ripping the QR code and randomly generated code one image. Transmitting said image securely to a user (label printing company, etc.). The transmitting of the QR code and randomly generated code as one image is very important to ensure the two elements never become out of sync during the printing process. The single image includes when codes are in a file at a printing press and pulled from the file as printing is occurring so that the art and the codes are printed at the same time, rather than at a later time on already printed artwork.

Printing the QR code in a format visible to the human eye. Printing the randomly generated number, bar code or image invisibly in accordance with the teachings of U.S. Pat. No. 8,551,683 or another invisible ink. Decoding the QR code by a handheld reading device, in the case with GPAS, a mobile phone. Communicating of the reading device back to the secure database. Writing a geolocation data to the database along with any other relevant data and returns to the hand held reading device the invisible randomly generated code that was printed INVISIBLY with the QR Code. This return of the randomly generated code is by a message sent to the authenticating device, the message including but not limited to, a text message on a smart phone, email, a phone call based on user's preference, or the like. In one embodiment, if the information the consumer is looking at is GPAS information on a phone, then the phone is the likely device to display the randomly generated code. Illuminating the invisible information using the reading device and comparing it to the information displayed the same or another reading device, such as a handheld device (mobile phone) to determine it is in fact a genuine article. The reading device can be a modified camera, a modified smart phone, or a reader that is made special for the decoding process having an illumination wavelength and a viewing window to see the decoded print. A handheld device can accompany the reader for receiving a communication regarding the stored code email, a text or a telephone call.

The detection of the hidden number is accomplished by a device having a specific visible light source with a distinct emission spectra characterized by narrow peaks and gaps, together with a pigment that is selectively responsive at the wavelengths of specific peaks and/or unresponsive at the gaps in the spectrum. In one embodiment, an illumination source has narrow spectral band peaks, exemplified by certain types of fluorescent lamps. In such a source, a combination of narrow wavelength bands (typically three primary color wavelengths) when added normally simulate illumination from a broadband source such as sunlight, having a given color temperature. According to an inventive aspect, an illumination source as described is applied to a wavelength absorptive pigment that is matched to at least one narrow band in the source, by virtue of a band at which the pigment is strongly absorptive. The preferably narrow absorptive band of the pigment is at least partly complementary to one of the color peaks emitted from the lamp.

An exemplary narrow band illumination source for use according to the invention may have discrete spectral peaks at particular wavelengths at visible blue, green and red wavelength bands. When these spectral peaks are added at appropriate relative amplitudes, the illumination is perceived by the eye as substantially white broadband light. A blue peak at 440 nm.+−0.15 nm, a green peak at 544 nm.+−0.15 nm and a red peak at 611 nm.+−0.15 nm are provided. Preferably, the bands are added at energy levels that cause the sum of the three sources to appear as a nominal color, for example the white of sunlight.

A particular pigment having a nominal color when illuminated with a true broadband source is specifically matched to the narrow band illumination source as described. Preferably the pigment has an absorptive peak (i.e., a reflective spectral gap) that is sufficiently strong and sufficiently matched to the wavelength band of one of the illumination source peaks that the overall color or hue, from the summed proportions of reflected colors from the pigment, shifts substantially and noticeably based on whether the particular narrow band keying peak wavelength is present in the illumination source.

All patents mentioned in this specification are indicative of the levels of those skilled in the art to which the invention pertains, and are herein incorporated by reference to the same extent as if each individual publication was specifically and individually indicated to be incorporated by reference.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A dual code authentication process for documents comprising the steps of:
    activating a data generation engine that creates a first code and a randomly generated code;
    assigning said randomly generated code to said first code;
    inserting said first code and said randomly generated code into a secure cloud based database, wherein said first code and said randomly generated code are associated with each other in said cloud based database;
    combining said first code and said randomly generated code into one image;
    transmitting said one image securely to a user;
    printing said one image containing said first code and said randomly generated code on a document in a visible format;
    printing said randomly generated code on said document with an invisible ink;
    decoding said first code by a handheld reading device;
    communicating said decoded first code to said secure cloud based database;
    receiving said randomly generated code associated with said decoded first code from said secure cloud based database and displaying said randomly generated code on said reading device; and
    illuminating said invisible randomly generated code printed on said document with said reading device;
    wherein said randomly generated code stored on said cloud based database is visually displayed on said reading device in human readable form for human authentication to compare if said illuminated invisible randomly generated code matches said stored code displayed on said reading device, indicating said document is authentic and wherein if said illuminated invisible randomly generated code does not match said stored code displayed on said reading device said document is fake.

2. The dual code authentication process according to claim 1, wherein said first visible code and said invisible code have the same appearance.

3. The dual code authentication process according to claim 1, wherein said randomly generated code is human readable for human authentication and selected from the group consisting of a number, a bar code, or an image.

4. The dual code authentication process according to claim 1 including the step of writing a geolocation data to said secure cloud database.

5. The dual code authentication process according to claim 1 wherein said reading device is selected from a group consisting of a camera, a smart phone, or a reader.

6. The dual code authentication process according to claim 1 wherein said reading device includes a visible light source with an emission spectra characterized by narrow peaks and gaps.

7. The dual code authentication process according to claim 1 wherein said reading devices includes a visible light source with a combination of narrow wavelength bands.

8. The dual code authentication process according to claim 1 wherein invisible ink includes a pigment having a nominal color when illuminated with a true broadband source matched to an illumination source.

9. The dual code authentication process according to claim 1 wherein invisible ink includes a pigment having an absorptive peak that is matched to a wavelength band.

10. The dual code authentication process according to claim 1 wherein a narrow wavelength bands are selected from three primary color wavelengths to simulate illumination from a broadband source.

11. The dual code authentication process according to claim 10 wherein said wavelengths are visible blue, green and red wavelength bands.

12. The dual code authentication process according to claim 11 wherein said blue wavelength has a peak about 440 nm.+−0.15 nm, said green wavelength has a peak about 544 nm.+−0.15 nm and said red wavelength has a peak about 611 nm.+−0.15 nm are provided.

13. The dual code authentication process according to claim 1 wherein said step of receiving includes the step of communicating said code stored on said database in an email, a text, or a telephone call.

14. The dual code authentication process according to claim 1, wherein said first code is a QR symbol bar code.

15. The dual code authentication process according to claim 14 wherein said QR code and said randomly generated code are transmitted as one image wherein said transmitted code remains in sync during a printing process.

* * * * *